United States Patent
Kasuga

(10) Patent No.: US 6,170,906 B1
(45) Date of Patent: Jan. 9, 2001

(54) FRAMEWORK STRUCTURE OF AN AUTOMOBILE BODY

(75) Inventor: Tatsuo Kasuga, Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/234,483

(22) Filed: Jan. 21, 1999

(30) Foreign Application Priority Data

Jan. 22, 1998 (JP) .................................................. 10-010288

(51) Int. Cl.⁷ .................................................. B60K 37/00
(52) U.S. Cl. ................ 296/203.02; 296/194; 296/203.03
(58) Field of Search ..................................... 296/185, 187, 296/188, 189, 194, 203.01, 203.02, 191, 192, 198, 205, 203.03

(56) References Cited

U.S. PATENT DOCUMENTS

| | | | |
|---|---|---|---|
| 4,750,780 | * | 6/1988 | Harasaki et al. ...................... 296/192 |
| 4,909,565 | * | 3/1990 | Harasaki et al. ...................... 296/194 |
| 4,919,474 | * | 4/1990 | Adachi et al. ........................ 296/194 |
| 4,940,281 | * | 7/1990 | Komatsu ............................... 296/194 |
| 5,102,164 | * | 4/1992 | Fujinaka et al. ................. 296/194 X |
| 5,106,148 | * | 4/1992 | Ikeda et al. ........................... 296/194 |
| 5,348,114 | * | 9/1994 | Yamauchi ......................... 296/203 X |
| 5,868,457 | * | 2/1999 | Kitagawa ............................ 296/188 |
| 5,913,565 | * | 6/1999 | Watanabe .................... 296/203.02 X |
| 6,068,330 | * | 5/2000 | Kasuga et al. .................. 296/205 X |
| 6,099,071 | * | 8/2000 | Kasuga et al. ....................... 296/205 |

* cited by examiner

Primary Examiner—D. Glenn Dayoan
Assistant Examiner—Lori L. Coletta
(74) Attorney, Agent, or Firm—Arent Fox Kintner Plotkin & Kahn, PLLC

(57) ABSTRACT

A framework structure of an automobile body formed of a lightweight metal material is provided, wherein a press-molded member is placed at a joint part of a die casting member and an extrusion-molded member. In doing so, insufficient toughness of the die casing member is reinforced by the press-molded member, so that the impact energy absorption performance of a welded joint part of the die casting member and the extrusion-molded member is enhanced.

7 Claims, 3 Drawing Sheets

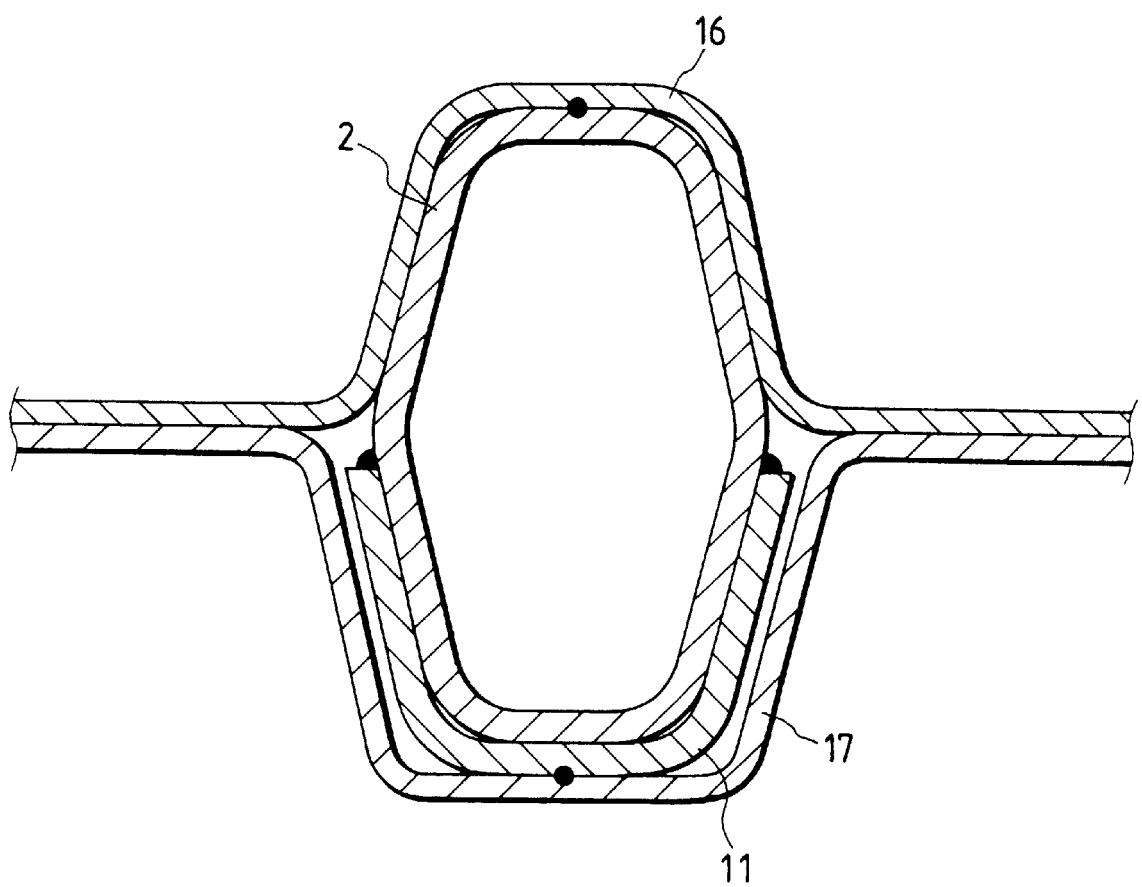

FRAMEWORK STRUCTURE OF AN AUTOMOBILE BODY

BACKGROUND OF THE DISCLOSURE

1. Field of the Invention

This invention relates to a framework structure of an automobile body formed of a lightweight metal material.

The present application is based on Japanese Patent Application No. Hei. 10-10288, which is incorporated herein by reference.

2. Description of the Related Art

For a lightweight metal material such as aluminum, a long size material which is complicated in cross section can be formed comparatively easily by extrusion or the light weight metal material can be provided with die casting. (Moreover, a strength equivalent to that of steel.) Thus, in recent years, attention has been focused on applications of light weight metal material as a frame material of an automobile.

By the way, a die casting has high rigidity, but is poor in toughness. Thus, if an extrusion is simply welded to the die casting, the die casting is broken due to impact load at the vehicle collision time and impact energy absorption characteristic at the deformation time, one of excellent features of the aluminum material, is impaired.

SUMMARY OF THE INVENTION

In view of the foregoing, it is therefore an object of the invention to provide a framework structure of an automobile body designed to be able to enhance yield strength of a joint part of a die casting member and an extrusion-molded member against the impact load.

According to the invention, there is provided a framework structure of an automobile formed of a lightweight metal material, in which a press-molded member is placed at a joint part of a die casting member and an extrusion-molded member. In doing so, insufficient toughness of the die casing member is reinforced by the press-molded member, so that the impact energy absorption performance of a welded joint part of the die casting member and the extrusion member is enhanced.

Features and advantages of the invention will be evident from the following detailed description of the preferred embodiments described in conjunction with the attached drawings.

BRIEF DESCRIPTION OF THE DRAWINGS

In the accompanying drawings:

FIG. 3 is a sectional view taken along a plane of a joint part of the front dashboard lower cross member and a side frame orthogonal to the axis of the side frame.

DETAILED DESCRIPTION OF THE PREFERRED EMBODIMENTS

Referring now to the accompanying drawings, there is described with an embodiment of the invention.

Figure 1:
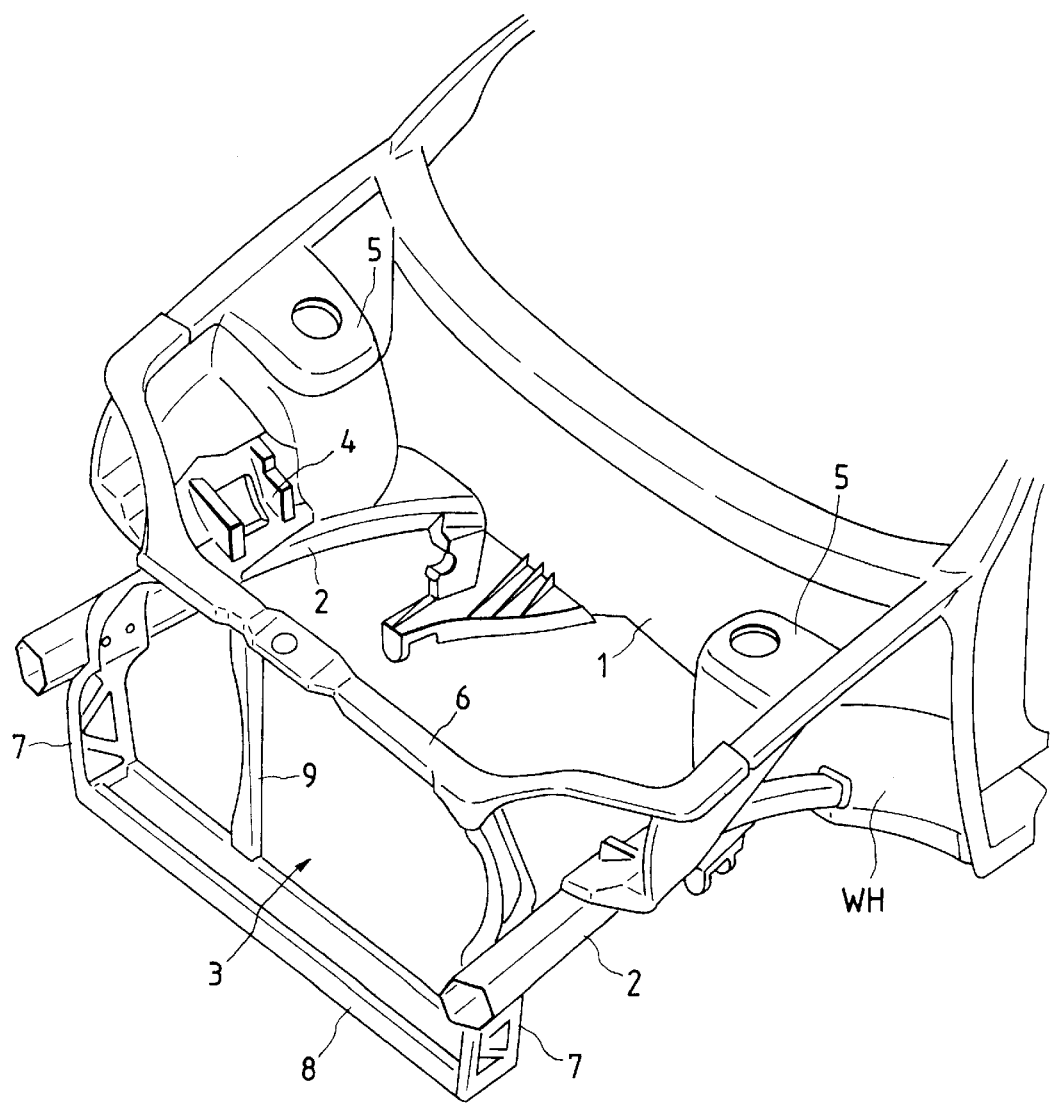
FIG. 1 is a perspective view showing the front of a framework of an automobile body according to the present invention.

FIG. 1 shows a front portion of a framework structure of an automobile body according to the present invention. The framework is assembled by joining various members formed of aluminum alloy to each other. The framework comprises a pair of side frames 2 joined at rear ends thereof to lower parts of a front dashboard 1 and extending forward, and a front bulkhead 3 joined to the front ends of both the size frames 2.

Each of the side frames 2 is made of a hollow material having hexagon contours and molded by extrusion molding. The side frame 2 is bent in an appropriate curvature so as to become concave downward to avoid interference with a front axle. An engine mount bracket 4, a strut tower 5, and the like are jointed at proper places to the side frame 2. A front bumper (not shown) is attached to the front end of the side frame 2.

The front bulkhead 3 comprises an upper member 6 molded by press molding, a pair of side members 7 molded by die casting, and a lower member 8 molded by extrusion molding. The right and left ends of the lower member 8 are welded to the lower ends of both the side members 7 and the upper ends of both the side members 7 and the upper member 6 are jointed by bolts (not shown) into a subassembly. Side-to-side intermediate portions of the upper member 6 and the lower member 7 are coupled by a longitudinal member 9 molded by press molding. The intermediate portions of both side members 7 in the upward and downward direction are joined to the side frame 2 by bolts, whereby the front bulkhead 3 can be attached to and detached from the side frame 2 repeatedly as desired.

A die casting member of an aluminum material is poor in toughness as described in the above. Thus, if it is combined with an extrusion member, the impact energy absorption characteristic tends to be impaired. Then, in the invention, a press-molded member is placed at the joint part of the die casting member and the extrusion-molded member.

Figure 2:
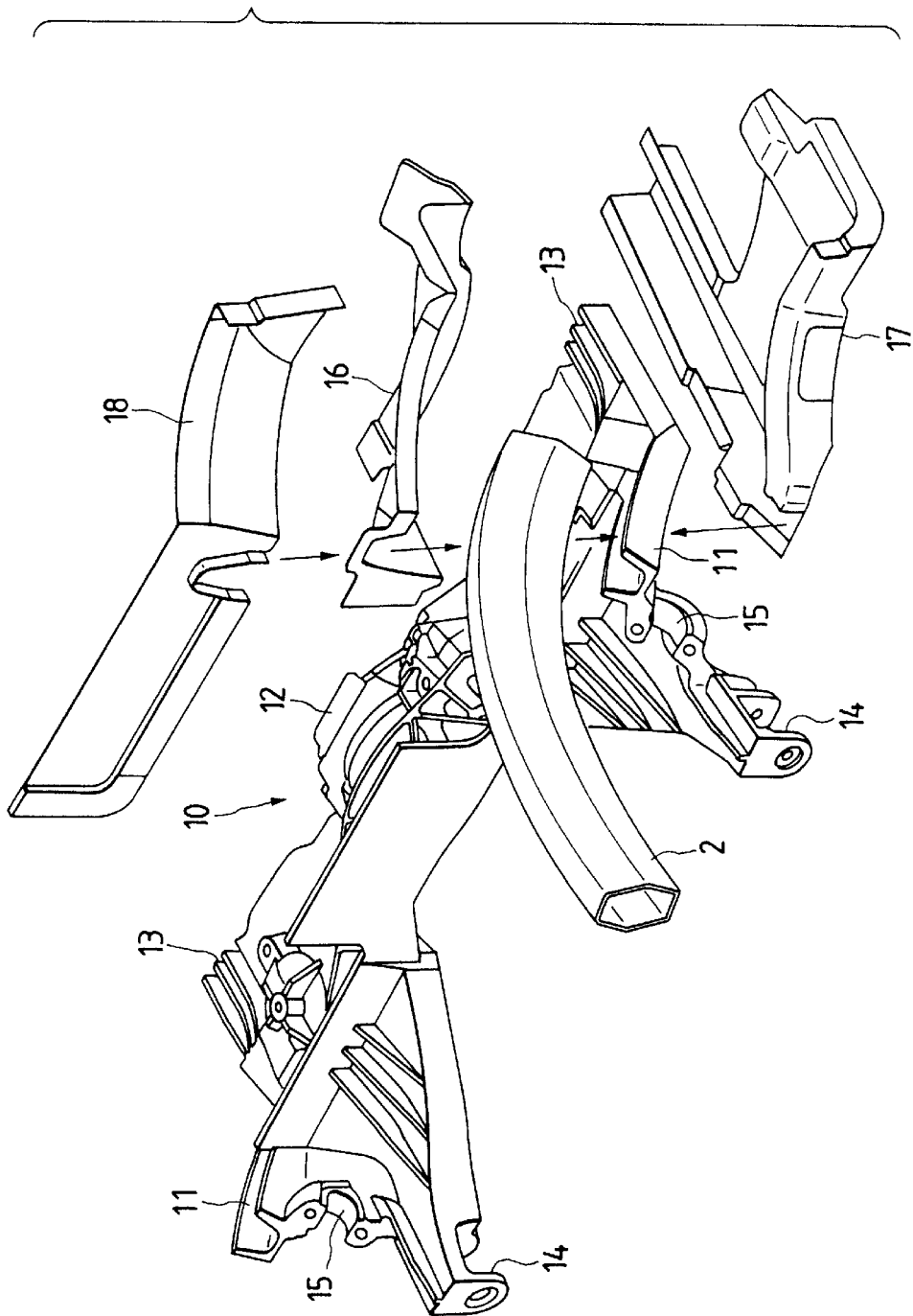
FIG. 2 is an exploded perspective view of surroundings of a front dashboard lower cross member.

FIG. 2 shows the joint part of the side frame 2 to the lower portion of the front dashboard 1 in detail as an embodiment of the invention. A dashboard lower cross member 10 extending from side to side and forming a strength member of the car body is disposed in the lower portion of the front dashboard 1. The dashboard lower cross member 10 comprises a joint part 11 to the side frame 2, a joint part 12 to a floor tunnel, a joint part 13 to a floor member, a support part 14 of a front lateral link, and a support part 15 of a power steering, which are molded in one piece by die casting.

The joint part 11 to the side frame 2 is shaped like a groove capable of receiving the lower half of the lower end of the side frame 2 which is hexagonal in cross section, and the lower end of the side frame 2 is MIG (Metal Inert Gas)-welded to the part. As also shown in FIG. 3, an upper panel 16 and a lower panel 17 comprising aluminum alloy plate material and molded by press molding sandwich the joint part from the top and the bottom for surrounding the outside of the joint part. And the panels 16 and 17 are spot-welded at appropriate points of the side frame 2 and the dashboard lower cross member 10. Further, a lower dashboard panel 18 comprising aluminum alloy plate material and molded by press molding is joined. They form parts of the dashboard 1 and a wheel house WH in FIG. 1.

The invention is not limited to the parts previously described in the embodiment and can be widely applied to the joint part of a die casting member and an extrusion-molded member, needless to say.

Thus, according to the invention, insufficient toughness of the die casing member is reinforced by the press-molded member. That is, the joint part of the die casting member and the extrusion-molded member is reinforced by the press-molded member so as to enhance both of toughness and rigidity of the framework. Therefore, if the die casing member is used, the impact energy absorption performance is not impaired; easiness to manufacture is compatible with passenger protection efficiency and a large advantage can be provided.

Although the invention has been described in its preferred form with a certain degree of particularity, it is understood that the present disclosure of the preferred form can be changed in the details of construction and in the combination and arrangement of parts without departing form the spirit and the scope of the invention as hereinafter claimed.

What is claimed is:

1. A framework of an automobile body of a lightweight metal material, said framework comprising:

a dashboard lower cross member that extends from side to side and forms a strength member of the automobile body, said dashboard lower cross member is die cast and disposed in a lower portion of a front dashboard;

a side frame member that is extrusion-molded and made of a hollow material; and a panel member that is press-molded and placed at a joint part of said dashboard lower cross member and said side frame member where said dashboard lower cross member connects with said side frame member such that said dashboard lower cross member is between said side frame member and said panel member to reinforce a connection of said dashboard lower cross member and said side frame member to enhance a toughness and rigidity of the framework.

2. The framework of an automobile body according to claim 1, wherein said panel member further comprises an upper panel and a lower panel sandwich said side frame member and said joint part from a top and a bottom respectively to surround said side frame member and said joint part.

3. The framework of an automobile body according to claim 2, wherein said upper panel is spot-welded to a top portion of said side frame member and said lower panel is spot-welded to an exterior surface of said joint part.

4. The framwork of an automobile body according to claim 3, wherein said upper and lower panels are made of aluminum alloy plate material.

5. The framework of an automobile body according to claim 1, wherein said joint part is groove shaped to receive a lower part of said side frame member.

6. The framework of an automobile body according to claim 5, wherein said side frame member has a hexagonal cross section and said lower part of said side frame member is metal inert gas welded to said joint part.

7. The framework of an automobile body according to claim 1, wherein said dashboard lower cross member is made of aluminum alloy.

* * * * *